United States Patent
Buvat et al.

(10) Patent No.: US 9,065,109 B2
(45) Date of Patent: Jun. 23, 2015

(54) METHOD FOR PREPARING A COMPOSITE MATERIAL COMPRISING A POLYMERIC MATRIX AND A FILLER CONSISTING IN ION EXCHANGE INORGANIC PARTICLES

(75) Inventors: Pierrick Buvat, Montbazon (FR); Philippe Mazabraud, Orleans (FR); Herve Galiano, La Ville Aux Dames (FR); Jannick Bigarre, Tours (FR); Veronique Bounor-Legare, Lyons (FR); Frederick Niepceron, Bourgoin-Jallieu (FR); Jean-Francois Gerard, Bron (FR)

(73) Assignees: COMMISSARIAT A L'ENERGIE ATOMIQUE ET AUX ENERGIES ALTERNATIVES, Paris (FR); INSTITUT NATIONAL DES SCIENCES APPLIQUEES, Villeurbanne Cedex (FR)

( * ) Notice: Subject to any disclaimer, the term of this patent is extended or adjusted under 35 U.S.C. 154(b) by 223 days.

(21) Appl. No.: 13/704,524
(22) PCT Filed: Jun. 15, 2011
(86) PCT No.: PCT/EP2011/059882
§ 371 (c)(1), (2), (4) Date: Dec. 14, 2012
(87) PCT Pub. No.: WO2011/157727
PCT Pub. Date: Dec. 22, 2011

(65) Prior Publication Data
US 2013/0092873 A1  Apr. 18, 2013

(30) Foreign Application Priority Data
Jun. 15, 2010 (FR) .................... 10 54735

(51) Int. Cl.
*H01M 8/10* (2006.01)
*B01D 69/14* (2006.01)
*C08J 5/22* (2006.01)
*B01D 67/00* (2006.01)
*B01D 71/02* (2006.01)
*B01D 71/32* (2006.01)
*B01D 71/82* (2006.01)

(52) U.S. Cl.
CPC ......... *H01M 8/1072* (2013.01); *B01D 67/0048* (2013.01); *B01D 67/0079* (2013.01); *B01D 69/148* (2013.01); *B01D 71/027* (2013.01); *B01D 71/32* (2013.01); *B01D 71/82* (2013.01); *H01M 8/1039* (2013.01); *H01M 8/1048* (2013.01); *H01M 8/1074* (2013.01); *Y02E 60/523* (2013.01); *C08J 5/2275* (2013.01); *C08J 5/2281* (2013.01); *C08J 2327/16* (2013.01); *C08J 2327/20* (2013.01); *B01D 2323/40* (2013.01); *B01D 2325/42* (2013.01)

(58) Field of Classification Search
None
See application file for complete search history.

(56) References Cited

U.S. PATENT DOCUMENTS

| 8,501,369 | B2 * | 8/2013 | Niepceron et al. ............ 429/493 |
| 2004/0126638 | A1 | 7/2004 | Chen et al. |
| 2007/0292486 | A1 * | 12/2007 | Sen et al. ..................... 424/443 |
| 2011/0190526 | A1 | 8/2011 | Barboiu et al. |

FOREIGN PATENT DOCUMENTS

FR  2928920 A1  9/2009
WO  WO 2009000779 A1 * 12/2008

* cited by examiner

*Primary Examiner* — Ling Choi
*Assistant Examiner* — Catherine S Branch
(74) *Attorney, Agent, or Firm* — Hultquist, PLLC; Mary B. Grant

(57) ABSTRACT

The invention relates to a method for preparing a composite material comprising a polymeric matrix and a filler consisting in ion exchange inorganic particles, comprising a step for synthesis in situ of said particles within the polymeric matrix.

17 Claims, 1 Drawing Sheet

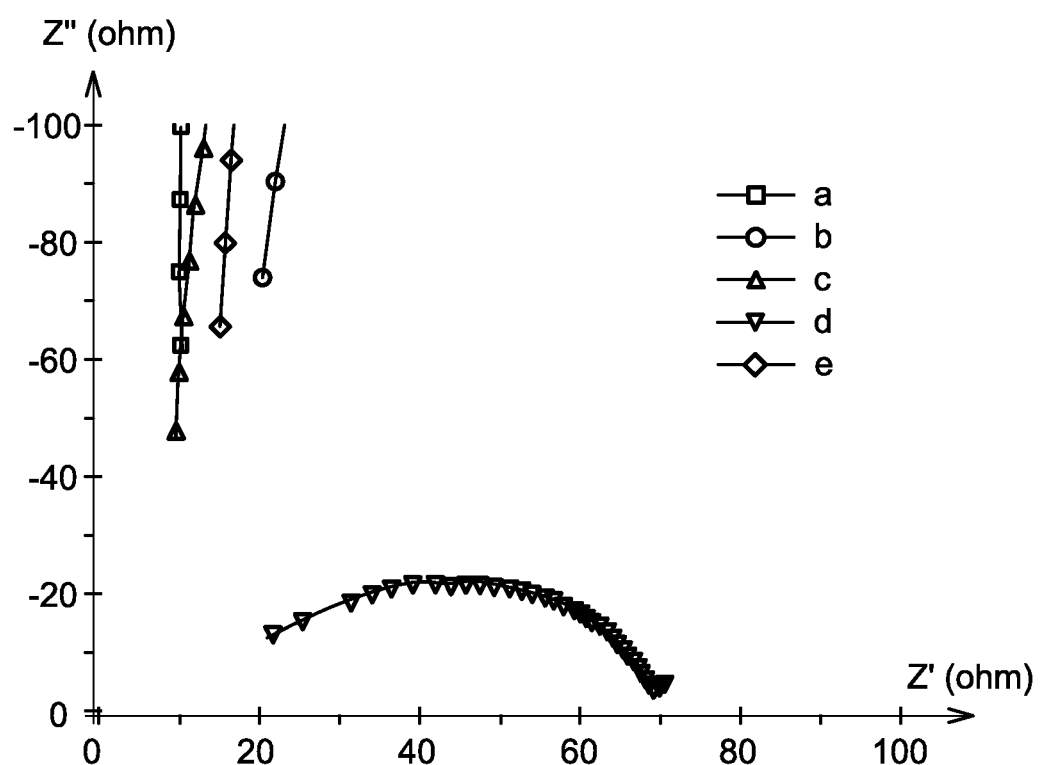

METHOD FOR PREPARING A COMPOSITE MATERIAL COMPRISING A POLYMERIC MATRIX AND A FILLER CONSISTING IN ION EXCHANGE INORGANIC PARTICLES

CROSS-REFERENCE TO RELATED APPLICATIONS

This application is a U.S. national phase under the provisions of 35 U.S.C. §371 of International Patent Application No. PCT/EP11/59882 filed Jun. 15, 2011, which in turn claims priority of French Patent Application No. 1054735 filed Jun. 15, 2010. The disclosures of such international patent application and French priority patent application are hereby incorporated herein by reference in their respective entireties, for all purposes.

TECHNICAL FIELD

The present invention relates to a method for preparing an ion exchange composite material comprising a polymeric matrix and a filler consisting in ion exchange inorganic particles.

These materials prepared according to the method of the invention may find application in fields requiring ion exchange, such as this is the case in the purification of effluents and in electrochemistry.

In particular, these composite materials may find their application in the design of fuel cell membranes, such as proton conducting membranes for fuel cells operating with $H_2$/air or $H_2/O_2$ (these cells being known under the acronym of PEMFC for <<Proton Exchange Membrane Fuel Cell>>) or operating with methanol/air (these cells being known under the acronym DMFC for Direct Methanol Fuel Cell).

One of the general technical fields of the invention may thus be defined as that of fuel cell and proton conducting membranes.

STATE OF THE PRIOR ART

A fuel cell is an electrochemical generator, which converts chemical energy from an oxidation reaction of a fuel in the presence of an oxidizer, into electric energy.

Generally, a fuel cell includes a plurality of electrochemical cells mounted in series, each cell comprising two electrodes with opposite polarity separated by a proton exchange membrane acting as a solid electrolyte.

The membrane ensures the passage towards the cathode of the protons formed during the oxidation of the fuel at the anode.

The membranes structure the core of the cell and therefore have to have good performances in terms of proton conduction, as well as low permeability to reactive gases ($H_2$/air or $H_2/O_2$ for PEMFC cells and methanol/air for DMFC cells). The properties of the materials making up the membranes are essentially thermal stability, resistance to hydrolysis and to oxidation as well as some mechanical flexibility.

Membranes currently used and meeting these requirements are membranes obtained from polymers for example belonging to the family of polysulfones, polyetherketones, polyphenylenes. However, it was noticed that these non-fluorinated polymers degrade relatively rapidly in a fuel cell environment and their lifetime for the moment remains insufficient for the PEMFC application.

Membranes having more important properties as regards lifetime are membranes obtained from polymers consisting of a perfluorinated linear main chain and of side chains bearing an acid group, such as sulfonic acid groups. Among the most known, mention may be made of the membranes marketed under the name of NAFION® by Dupont de Nemours or under the name of Dow®, FLEMION® or Aciplex by the Dow Chemicals and Asahi Glass corporations. These membranes have good electrochemical performances and an interesting lifetime but are nevertheless insufficient for PEMFC applications. Further, their cost (more than 500 euros/$m^2$) remains prohibitive for marketing. For DMFC applications, they have a high permeability to methanol, which also limits their use with this type of fuel. Furthermore, the monomers making them up, have a structure of the hydrophilic/hydrophobic type which makes them particularly sensitive to hydration and dehydration phenomena. Thus, their operating temperature is typically located around 80° C., since beyond this value, hydration instabilities cause premature aging of the membranes.

In order to obtain long term efficiency as regards proton conduction at temperatures above 80° C., certain authors have focused their research on the design of more complex materials further comprising a polymeric matrix of proton conducting particles, the conductivity thereby no longer being exclusively dedicated to the constitutive polymer(s) of the membranes. Consequently, it is thus possible to use a wider panel of polymers for entering the composition of the membrane.

This is the case of International Application WO 2009/000797, which describes composite materials comprising a polymeric matrix and a filler consisting in organic particles, such as clay particles, grafted with ion exchange groups.

Conventionally, these materials are prepared via two large synthesis routes: the route using a solvent and the route applying elements (in this case here, polymer and particles) in the molten state (subsequently called molten route).

The route using a solvent consists of putting the polymer and the inorganic particles in contact with each other in a solvent. The resulting mixture is then cast by depositing it on a substrate and the solvent is then left to evaporate.

This synthesis route has the advantage of being very simple to use and of not requiring any sophisticated apparatus. However, when it is intended to be applied on a large scale, this route poses handling difficulties as to the volumes of solvent used and safety problems inherent to the vapors of solvent which may be harmful or even carcinogenic. As to the obtained composite material, it is difficult to obtain a proper density of the latter, notably in connection with the solvent evaporation phenomenon which generates a material structure which is difficult to control.

The molten route, as for it, consists in transforming precursor elements of the composite material (i.e., the polymer(s) and the particles) initially solid in a melt. To do this, the particles are conventionally introduced by mechanical dispersion into the molten polymer. However, this technique inter alia has the problem of obtaining a fine and homogeneous dispersion of the inorganic particles in the aforementioned polymer(s). Thus the result is a material having non-uniform ion exchange properties, notably because of the concentration of particles by percolation in certain locations of the obtained final material.

Furthermore, whether this occurs with the solvent route or the molten route, it is difficult to obtain materials having a strong proportion of ion exchange inorganic particles in the polymeric matrix.

Thus, a real need exists for a method for preparing a composite material comprising, in a matrix, a dispersion of ion exchange inorganic particles, which may be applied, for example, for designing proton exchange membranes for fuel cells, which would inter alia give the possibility of:
- obtaining, in the resulting material, a homogeneous distribution of the particles in the polymeric matrix and thus homogeneity as to the ion exchange properties;
- obtaining, in the resulting material, when this is desired, significant proportions of ion exchange inorganic particles in the polymeric matrix.

DISCUSSION OF THE INVENTION

In order to overcome the aforementioned drawbacks, the inventors have developed an innovative and inventive method for synthesizing a composite material, the ion exchange properties of which are totally or partly imparted by inorganic particles.

The invention thus relates to a method for preparing a composite material comprising a polymeric matrix and a filler consisting in ion exchange inorganic particles comprising a step for synthesis in situ of said particles within the polymeric matrix.

By proceeding in this way, the following drawbacks are set aside:
- the mixing problems between the inorganic particles and the polymer(s) making up the polymeric matrix;
- the problems of inhomogeneous distribution of the particles within the polymer(s);
- the anisotropic problems as to the ion exchange properties encountered in embodiments of the prior art, because of the mixing and distribution problems, these problems being solved by the fact that the particles are generated in situ within the matrix.

Before giving more details, the following definitions are specified.

By <<synthesis step in situ>>, is meant a synthesis step carried out within the actual polymeric matrix, which in other words means that the inorganic particles do not pre-exist outside the polymeric matrix.

By ion exchange inorganic particles, are meant inorganic particles at the surface of which are bound one or more ion exchange organic groups.

These may be oxide particles functionalized by ion exchange groups, such as silica particles functionalized with ion exchange groups.

The step for synthesis in situ of the inorganic particles may be carried out with the sol-gel method, i.e. precursors of said particles undergo a hydrolysis-condensation operation within the actual material.

According to a first alternative, the synthesis step may comprise the following operations:
- an operation for putting the constitutive polymer(s) of the matrix in contact with one or more precursors of the inorganic particles, said precursor(s) fitting the following formula:

$$(X)_{y-n}\text{-M-}(R)_n$$

wherein:
- M is a metal element or a metalloid element;
- X is a hydrolyzable chemical group;
- R is a ion exchange chemical group or a precursor group of an ion exchange chemical group;
- y corresponds to the valence of the element M; and
- n is an integer ranging from 0 to (y−1);
- a hydrolysis-condensation operation on said precursor(s) is performed, by means of which inorganic particles are obtained resulting from the hydrolysis-condensation of said precursor(s);
- in the case when R is a precursor group of an ion exchange chemical group, an operation for transforming the precursor group into an ion exchange chemical group or, in the case when n=0, an operation for functionalization of said particles with ion exchange chemical groups.

The hydrolysis-condensation operation may consist of heating the mixture from the contacting step to an efficient temperature, for example to a temperature ranging from 150 to 300° C. in order to generate said hydrolysis-condensation operation possibly in the presence of a catalyst.

The synthesis step in situ achieved according to the first alternative has the following advantages:
- good miscibility between the precursors and the constitutive polymer(s) of the matrix, which finally gives the possibility, if desired, of accessing large proportions of inorganic particles in the matrix;
- the absence of use of organic solvents conventionally used in methods for preparing composite materials of the type of the invention, which gives the possibility of setting aside the recurrent problems of toxicity and porosity inherent to the use of an organic solvent.

In order to avoid the use of a catalyst, and the problems which may be generated by poor dispersion of this catalyst during the contacting step, it is proposed according to the invention to carry out the step for synthesis in situ of the inorganic particles, according to a second alternative, which step is carried out with a sol-gel method comprising the following operations:
- an operation for hydrolysis of one or more precursors of inorganic particles of the following formula:

$$(X)_{y-n}\text{-M-}(R)_n$$

wherein:
- M is a metal element or a metalloid element;
- X is a hydrolyzable chemical group;
- R is an ion exchange chemical group or a precursor group of an ion exchange chemical group;
- y corresponds to the valence of the element M; and
- n is an integer ranging from 0 to (y−1);
- an operation for putting the hydrolyzate obtained in the preceding step in contact with the constitutive polymer(s) of the matrix;
- an operation for heating the resulting mixture to an effective temperature in order to generate a transformation of the hydrolyzate into inorganic particles;
- in the case when R is a precursor group of an ion exchange chemical group, an operation for transforming the precursor group into an ion exchange chemical group or, in the case when n=0, an operation for functionalizing said particles with ion exchange chemical groups.

The aforementioned hydrolysis operation may consist of putting said precursors into contact with an acid aqueous solution optionally comprising one or more alcoholic solvents.

Thus, as an example, it is possible to put said precursors into contact with an amount of water, so as to attain a molar ratio between the hydryolzable functions of the precursors and the number of moles of water generally comprised between 0.001 and 1,000, preferably between 0.1 and 10.

The addition of water depending on the precursors used may lead to the demixing of phases because of a miscibility problem between the water and the precursors. Thus, it may be useful to add an alcoholic solvent in determined proportions, for example (methanol, ethanol, propanol), in order to improve the miscibility of the precursors in the water. Generally, the alcoholic solvent may be added by observing a mass ratio with the water ranging up to 100, in particular being comprised between 0 and 1. Furthermore, for activating hydrolysis, it may be advantageous to acidify the solution, so as to obtain a resulting solution advantageously having a pH below 2. This acidification may be achieved by adding to the solution an acid, such as hydrochloric acid, sulfuric acid, nitric acid, or an organic acid.

Once this hydrolysis operation is carried out, the hydrolyzate is added to the polymer(s) intended to make up the polymeric matrix followed by an operation for heating to an effective temperature in order to transform the hydrolyzate into inorganic particles.

This temperature may be easily determined by one skilled in the art by making tests at different temperatures until a temperature is found at which the hydrolyzate gives rise to inorganic particles.

Whether this be for the first alternative or the second alternative, the metal element M may be selected from a group formed by transition metals, lanthanide metals and so-called post-transition metals from columns IIIA and IVA of the periodic classification of the elements. In particular, the transition metal elements may be selected from Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt. In particular, the lanthanide element may be selected from La, Ce, Pr, Nd, Sm, Eu, Gd, Tb, Dy, Er, Yb. In particular, the post-transition metal element may be selected from elements of column IIIA of the periodic classification, such as Al, Ga, In and Tl and the elements of column IVA of the periodic classification, such as Ge, Sn and Pb.

The metalloid element M may be selected from Si, Se, Te.

Advantageously, M may be an element selected from Si, Ti and Al, in particular, Si.

The hydrolyzable group X may advantageously be a good leaving group during the hydrolysis-condensation operation mentioned above.

This group X may for example be a halogen atom, an acrylate group, an acetonate group, an alcoholate group of formula —OR', a secondary or tertiary amine group, wherein R' represents an alkyl group for example comprising from 1 to 10 carbon atoms, in particular an ethyl group.

Preferably, X is an —OR' group as defined above, or a halogen atom.

When the group R is an ion exchange chemical group, this may be a cation exchange chemical group (for example, a proton exchanger) or an anion exchange group.

The group R may be a group of formula -$R^2$-Z, wherein $R^2$ is a simple bond, a linear or branched alkylene group comprising from 1 to 30 carbon atoms, preferably from 1 to 10 carbon atoms or a cyclic hydrocarbon group, and Z is an ion exchange chemical group.

In particular, when it is a cation exchange group, the group R may be a group of formula -$R^2$-$Z^1$, wherein:
$R^2$ is a simple bond, a linear or branched alkylene group, for example comprising from 1 to 30 carbon atoms, preferably from 1 to 10 carbon atoms or a cyclic hydrocarbon group, such as an aromatic or heterocyclic group;
$Z^1$ is a —$SO_3H$, —$PO_3H_2$, —$CO_2H$ group, optionally as salts.

It is specified that by salt is meant conventionally a —$SO_3X$, —$PO_3X_2$ or —$CO_2X$ group wherein X represents a cation.

When it is an anion exchange group, the group R may be a group of formula -$R^2$-$Z^2$, wherein:
$R^2$ is a simple bond, a linear or branched alkylene group, for example comprising from 1 to 30 carbon atoms, preferably from 1 to 10 carbon atoms or a cyclic hydrocarbon group, such as an aromatic or heterocyclic group;

$Z^2$ is an amine group, a phosphonium group or a sulfonium group.

It is specified that by phosphonium group is conventionally meant a group comprising a positively charged phosphorus atom, this group may stem from the reaction of a phosphine compound (such as triphenylphosphine) with an alkyl halide or benzyl alcohol.

It is specified that by a sulfonium group is conventionally meant a group comprising a positively charged sulfur atom, this group may stem from the reaction of a thioester compound with an alkyl halide.

It is specified above that the group R may also be a precursor chemical group of an ion exchange group.

By precursor chemical group of an ion exchange group is conventionally meant a group capable of being transformed by a suitable chemical reaction into said ion exchange group.

Such a group R may be a group of formula -$R^2$-$Z^3$, wherein:
$R^2$ is a simple bond, a linear or branched alkylene group, for example comprising from 1 to 30 carbon atoms, preferably from 1 to 10 carbon atoms or a cyclic hydrocarbon group, for example an aromatic or heterocyclic group;
$Z^3$ is a precursor group of a group $Z^1$ or $Z^2$ as mentioned above.

When a precursor of this type is used (i.e. a precursor comprising a precursor group of an ion exchange group), it is necessary to engage an operation for transforming the precursor group into an ion exchange chemical group.

Thus, when the group $Z^1$ is an —$SO_3H$ group, optionally as a salt, the group -$Z^3$ may be a thiol group —SH, which will undergo a transformation operation consisting of subjecting it to oxidation with oxygenated water followed by acidification with concentrated sulfuric acid.

When the group $Z^1$ is a —$CO_2H$ group, optionally as a salt, the group -$Z^3$ may be an ester group or an acid chloride group which may be transformed into a —$CO_2H$ group, optionally as a salt, by hydrolysis.

The aforementioned precursors may advantageously be alkoxysilanes or halogenosilanes (in which case M is Si and X is an —OR' group or a halogen atom) comprising at least one group R as defined above.

Precursors meeting this specificity may thus be precursors fitting the following formula:

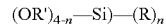

wherein:
R' is as defined above;
R corresponds to the formula -$R^2$-$Z^3$, $R^2$ being a linear or branched alkylene group, comprising from 1 to 30 carbon atoms, preferably from 1 to 10 carbon atoms, and $Z^3$ being a precursor group of a group $Z^1$ or $Z^2$ as mentioned above;
n is an integer ranging from 1 to 3.

For example, $Z^3$ may be a thiol group.

As an example, mention may be made of mercaptopropyltriethoxysilane of formula HS—$(CH_2)_3$—$Si(OCH_2CH_3)_3$.

When, for the aforementioned precursors, n is equal to 0, it is necessary, at the end of the method, to perform an operation for functionalizing said particles by introducing ion exchange chemical groups onto said particles.

The suitable functionalization reactions will be selected by one skilled in the art depending on the obtained and desired material. These may for example be substitution reactions on aromatic rings, additions on unsaturated bonds, oxidation of oxidizable groups, the outcome of these reactions having the consequence of grafting ion exchange groups on the particles by covalence.

The aforementioned precursors may be used in combination with a precondensate comprising recurrent units of the following formula:

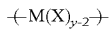

wherein:
M is a metal or metalloid element as defined above;
X is a group as defined above;
y corresponds to the valence of the metal or metalloid element.

In particular, X may correspond to an —OR' group with R' being as defined above.

As an example, this may thus be a precondensate of tetramethoxysilane comprising recurrent units of the following formula:

or further a precondensate of tetrapropoxysilane.

The precondensates may give the possibility of ensuring structuration of the inorganic particles, for example by increasing their cohesion.

The mass levels between the aforementioned precursors and the precondensates will be adapted so as to obtain the best compromise between structuration and functionalization.

As an example, the (precursor/precondensate) mass ratio may be comprised between 0.01 and 50 and more generally between 0.1 and 20.

Regardless of the applied embodiments, the constitutive polymer(s) of the matrix are advantageously hot-melt polymers, in particular when the synthesis step is achieved by extrusion. For example, the polymers may advantageously have a glassy transition temperature or a melting temperature conventionally ranging from 100 to 350° C.

In particular, the polymer(s) intended to form the matrix may be selected from thermoplastic polymers, such as fluorinated thermoplastic polymers.

These may notably be non-ion-exchange fluorinated thermoplastic polymers, such as a (co)polymer comprising at least one type of recurrent units stemming from a fluorinated monomer for example, polytetrafluorethylenes (known under the acronym of PTFE), polyvinylidene fluorides (known under the acronym of PVDF), copolymers of fluorinated ethylene/propylene (known under the acronym of FEP) copolymers of ethylene and tetrafluorethylene (known under the acronym of ETFE) or such that a copolymer comprising at least two types of recurrent units stemming from fluorinated monomers, for example a copolymer of vinylidene fluoride and hexafluoropropene (known under the acronym of PVDF-HFP), and mixtures thereof.

These may also be ion exchange fluorinated thermoplastic polymers such as sulfonated perfluorinated polymers. It is specified that by sulfonated, perfluorinated polymers, are meant polymers comprising a perfluorinated linear main chain and side chains bearing sulfonic acid groups. Such polymers are notably available commercially under the trade mark NAFION® by Dupont de Nemours, or ACIPLEX-S® from Asahi Chemical.

The fluorinated polymers, because of the presence of stable —C—F bonds (with a binding energy of 485 kJ/mol), form polymers having excellent properties and characteristics, such as anti-adhesion, resistance to abrasion, resistance to corrosion, resistance to chemical etching and to temperature.

Advantageously, the method of the invention may be applied with a polymer of the PVDF-HFP type which is of interest for the stability of its fluorinated backbone, for its low production cost.

The mass ratio of the aforementioned precursors (optionally combined with at least one precondensate as defined above) relatively to the constitutive polymer(s) of the matrix may range up to 80%, advantageously from 5 to 50%.

Whether this be for the first alternative or second alternative, the step for the synthesis in situ of the particles may be achieved by extrusion of the polymer(s) intended to form the matrix and of the aforementioned precursors, optionally in the presence of a precondensate as defined above (for the first alternative) or of a hydrolyzate (for the second alternative), which means that the contacting operation and the heating operation (according to the first alternative and to the second alternative) occur within an extruder, the other operations may be carried out outside the extruder.

Thus, in this scenario, the constitutive polymer(s) and the precursors, optionally in the presence of a precondensate as defined above (according to the first alternative) or of the hydrolyzate (according to the second alternative) are preferably introduced simultaneously through at least one inlet of an extruder, where they are intimately mixed (which forms the aforementioned contacting step). The polymer(s) may be introduced as powders, chips or granules, the latter form being the preferred form for reasons of facility of handling and supply. The thereby formed mixture then migrates in the extruder until it reaches the end of the latter.

The formation of the inorganic particles via the precursors or the hydrolyzate is achieved during the dwelling time of the mixture in the extruder by heating to a suitable temperature.

The operating conditions of the extrusion, such as the screw profile, the dwelling time of the mixture, the speed of rotation of the screw will be set by one skilled in the art depending on the desired morphology of the final material and on the sought dispersion of inorganic particles in the polymetric matrix.

As an example, the extrusion may advantageously be achieved with the following operating conditions:
a screw profile of the co-rotary interpenetrating twin screw type;
a dwelling time of the aforementioned mixture comprised between 0.1 minute and 120 minutes, preferably from 2 to 30 minutes;
a speed of rotation of the screw comprised between 5 and 1000 revolutions/minute, preferably between 50 and 200 rpm;
a temperature of the mixture ranging from 150 to 350° C., preferably from 180 to 250° C.

The extruder may be equipped with a flat die, allowing films to be obtained which may have a thickness ranging from 5 to 500 μm or further a die, a so-called <<ring die>> allowing rings or possibly granules to be obtained if the rings are intended to be cut.

As an example, a particular method of the invention consists in a method for synthesis of a composite material comprising a polymeric matrix and a filler consisting in oxide particles, such as silica, comprising ion exchange groups of formula -$R^2$-$Z^1$ as defined above comprising the following operations:
an operation for putting in an extruder, one or more constitutive fluorinated polymers of the polymeric matrix in contact with one or more precursors of the aforementioned inorganic particles, said precursor(s) fitting the following formula:

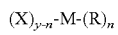

wherein:
M is a metal element or a metalloid element;
X is a hydrolyzable chemical group;
R is group of formula -$R^2$-$Z^3$ as defined above;

y corresponds to the valence of the group M; and
n is an integer ranging from 0 to(y−1);
said precursor(s) being used in combination with a precondensate of formula:

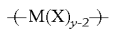

M, X and y being as defined above;

an operation in the extruder for hydrolysis-condensation of said precursor(s) in combination with said precondensate, by means of which inorganic particles are obtained, resulting from the hydrolysis-condensation of said precursors and of said precondensate;

an operation for transforming the aforementioned group $Z^3$ into an ion exchange chemical group $Z^1$.

For example, the precursor may be a precursor of the following formula:

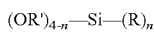

wherein:
R' is as defined above;
R corresponds to the formula $-R^2-Z^3$, $R^2$ being an alkylene group comprising from 1 to 30 carbon atoms, preferably from 1 to 10 carbon atoms, and $Z^3$ being a precursor group of a group $Z^1$ or $Z^2$ as mentioned above;
n is an integer ranging from 1 to 3.

A precursor fitting this definition given above may be mercaptopropyltriethoxysilane of formula $HS-(CH_2)_3-Si(OCH_2CH_3)_3$ and the precondensate is a precondensate for which M is Si and X is an —OR' group, R' being such as defined above, such as a precondensate of the polytetramethoxysilane type.

The fluorinated polymer may be a copolymer of vinylidene fluoride and of hexafluoropropene.

As an example, a particular method of the invention consists in a method for synthesis of a composite material comprising a polymeric matrix and a filler consisting in oxide particles, such as silica particles comprising ion exchange groups of formula $-R^2-Z^1$ as defined above, comprising the following operations:

an operation for hydrolysis of one or more precursors of the inorganic particles of the following formula:

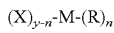

M is a metal element or a metalloid element;
X is a hydrolyzable chemical group;
R is a group for formula $-R^2-Z^3$ as defined above;
y corresponds to the valence of the group M; and
n is an integer ranging from 0 to (y−1);
said precursor(s) being used in combination with a precondensate of formula:

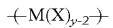

M, X and y being as defined above;

an operation for putting, in an extruder, the hydrolyzate obtained in the preceding step in contact with one or more fluorinated polymers intended to enter the composition of the matrix;

an operation for heating the resulting mixture to an effective temperature in order to generate transformation of the hydrolyzate into inorganic particles;

an operation for transforming the aforementioned group $Z^3$ into an ion exchange chemical group $Z^1$.

For example, the precursor may be a precursor of the following formula:

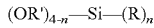

wherein:
R' is as defined above;
R corresponds to the formula $-R^2-Z^3$, $R^2$ being an alkylene group comprising from 1 to 30 carbon atoms, preferably from 1 to 10 carbon atoms, and $Z^3$ being a precursor group of a group $Z^1$ or $Z^2$ as mentioned above.
n is an integer ranging from 1 to 3.

A precursor fitting this definition given above may be mercaptopropyltriethoxysilane of formula $HS-(CH_2)_3-Si(OCH_2CH_3)_3$ and the precondensate is a precondensate for which M is Si and X is a group of formula —OR', R' being as defined above, such as a precondensate of the polytetramethoxysilane type.

The fluorinated polymer may be a copolymer of vinylidene fluoride and of hexafluoropropene.

The materials obtained according to the invention may appear in different forms, such as films, rings, granules.

These materials, because of the characteristics of the method, may have the following advantages:

if desired, a strong proportion of ion exchange inorganic particles in the polymeric matrix (for example, a proportion which may be greater than 40% by mass), thereby giving the possibility of attaining excellent ion exchange properties which no longer depend on the selection of the polymer(s);

a homogeneous material as to the distribution of said particles within the material and thus homogeneous ion exchange properties within this material;

a material for which the mechanical properties of the matrix are not or very little reduced by the presence of the inorganic particles, which may be explained, without being bound to theory, by the fact that the particles are not organized in percolated domains because they are made in situ within the actual matrix.

The method of the invention may be applied to wide fields of applications, from the moment that these domains involve the use of ion exchange materials.

Thus, the method of the invention may for example be applied to the following fields:

the field of electrochemistry, such as:
fuel cells, for example fuel cells operating with $H_2$/air or $H_2/O_2$ (known under the acronym of PEMFC for Proton Exchange Membrane Fuel Cell) or operating with methanol/air (known under the acronym of DMFC for Direct Methanol Fuel Cell), said materials designed by this method may enter the composition of proton exchange membranes;
lithium batteries, said materials designed by this method may enter the composition of the electrolytes;
the field of purification, such as the treatment of effluents; and
the field of electrochromism.

Thus, the method of the invention may be intended for preparing fuel cell membranes, intended to be inserted into a fuel cell device within an electro-membrane-electrode assembly.

These membranes advantageously appear as thin films, for example having a thickness from 20 to 200 micrometers.

In order to prepare such an assembly, the membrane may be placed between two electrodes, for example in fabric or in carbon paper impregnated with a catalyst. The assembly formed with the membrane positioned between both electrodes is then pressed at an adequate temperature in order to obtain good electrode-membrane adhesion.

The electrode-membrane-electrode assembly is then placed between two plates ensuring electric conduction and the supply of reagents to the electrodes. These plates are commonly designated by the term of bipolar plates.

The invention will now be described with reference to the following examples given as an illustration and not as a limitation.

SHORT DESCRIPTION OF THE DRAWINGS

The single FIGURE represents a Nyquist diagram for different materials prepared according to Example 2.

DETAILED DISCUSSION OF PARTICULAR EMBODIMENTS

EXAMPLE 1

In a micro-extruder provided by DSM equipped with two conical srews and a flat die, are gradually incorporated C g of a poly(vinylidene fluoride-co-hexafluoropropene) copolymer (symbolized hereafter as PVDF-HFP) as well as (A+B) g of a mixture of inorganic precursors consisting of mercaptopropyltriethoxysilane [HS—(CH$_2$)$_3$—Si(OEt)$_3$], Et designating an ethyl group with a molar mass of 238.42 g·mol$^{-1}$ and of a precondensate of polytetramethoxysilane comprising the following recurrent units —[(Si(OMe)$_2$)$_n$]— with a molar mass of 106.2 g·mol$^{-1}$, Me designating a methyl group.

The mixing is carried out at 190° C. for 15 minutes with a screw velocity of 100 revolutions/min. The material is then extracted at the exit by means of a micro-calendering machine also provided by DSM. Finally, a hybrid material film with a thickness comprised between 20 and 100 μm is recovered.

Several tests were conducted with different proportions of mercaptopropyltriethoxysilane (designated hereafter as mercapto-SH) and of precondensate of polytetramethoxysilane (designated hereafter only as precondensate) in the aforementioned mixture.

The table below groups the different proportions of mercaptopropyltriethoxysilane, of precondensate of tetramethoxysilane and of copolymer applied for the different tests.

| PVDF-HFP | | Mercapto-SH | | Precondensate | |
|---|---|---|---|---|---|
| Mass C (in g) | % by mass | Mass A (in g) | % by mass | Mass B (in g) | % by mass |
| 15 | 100 | 0 | 0 | 0 | 0 |
| 9 | 64.3 | 4.2 | 30 | 0.8 | 5.7 |
| 10 | 66.6 | 3.5 | 23.4 | 1.5 | 10 |

Let us note that, during the hydrolysis-condensation reaction which results from the heating in the extruder, the —O—CH$_2$—CH$_3$ and —OCH$_3$ groups are transformed into alcohol and the formed —Si—OH groups condense in order to form inorganic particles. There then subsists functional silica inorganic particles grafted with HS—CH$_2$—CH$_2$—CH$_2$— groups (from hydrolysis-condensation reactions of the mercaptopropyltriethoxysilane compound) and non-functional silica SiO$_2$ particles (from the hydrolysis-condensation reactions of the free condensate).

The table below describes the characteristics of the material in terms of mass percentages of —SH function, of functional inorganic particles as mentioned above and of non-functional silica particles as mentioned above.

| PVDF-HFP | —SH function | | Non-functional inorganic particles | | Functional inorganic particles | |
|---|---|---|---|---|---|---|
| Mass (in g) | Mass (in g) | % by mass | Mass (in g) | % by mass | Mass (in g) | % by mass |
| 15 | 0 | 0 | 0 | 0 | 0 | 0 |
| 9 | 2.2 | 19.1 | 1.4 | 13.2 | 2.7 | 23 |
| 10 | 1.9 | 14.7 | 1.6 | 13.9 | 2.7 | 21.3 |

The mass of SH function corresponds to the mass of HS—CH$_2$—CH$_2$—CH$_2$—SiO$_{3/2}$ generated after a hydrolysis-condensation reaction of mercaptopropyltriethoxysilane, i.e. corresponds to (A*127/238.42), A corresponding to the mass of aforementioned mercaptopropyltriethoxysilane, 127 corresponding to the molar mass of HS—CH$_2$—CH$_2$—CH$_2$—SiO$_{3/2}$ and 238.42 corresponding to the molar mass of mercaptopropyltriethoxysilane.

The mass percentage of —SH function is a mass percentage of SH based on the total mass of the final material. This mass percentage, after considering the hydrolysis-condensation reactions, is evaluated with the following formula:

$$\% = (A*127/238.42)/[(A*127/238.42)+(B*60/106.2)+C]*100$$

wherein:
A, B and C respectively correspond to the masses of mercaptopropyltriethoxysilane (molar mass of 238.42), of precondensate (molar mass of 106.2) and of PVDF-HFP; and
60 corresponds to the molar mass of SiO$_2$ from the hydrolysis-condensation of the precondensate.

The mass and the mass percentage of functional inorganic particles are determined in the following way.

$$Mass = (A*127/238.42)+(B*60/106.2)$$

$$\% = [(A*127/238.42+B*60/106.2)]/[(A*127/238.42)+(B*60/106.2)+C]*100,$$

The mass and the mass percentage of non-functional inorganic particles are determined in the following way.

$$Mass = (A*52/238.42)+(B*60/106.2)$$

$$\% = [(A*52/238.42+B*60/106.2)]/[(A*52/238.42)+(B*60/106.2)+C]*100,$$

52 corresponding to the molar mass of SiO$_{3/2}$ from hydrolysis-condensation reactions of the mercaptopropyltriethoxysilane compound.

The obtained films have strong proportions of inorganic particles.

EXAMPLE 2

This step illustrates the preparation of different materials in accordance with the invention including, before introduction into the extruder, a step for pre-hydrolysis of the precursors.

The general operating procedure of this pre-hydrolysis step is the following.

x g of ethanol and then y g of a solution of 10$^{-2}$ N hydrochloric acid are consecutively added to a preceding mixture of A g of mercaptopropyl-triethoxysilane [HS—(CH$_2$)$_3$—Si(OEt)$_3$] and B g of a precondensate of tetramethoxysilane (marketed by ABCR). After a reaction time of 10 hours at room temperature, the mixture of precursors is used (subsequently called a hydrolyzate) for the extrusion step with the PVDF-HFP polymer.

The operating conditions of the pre-hydrolysis step for the different tests applied are listed in the table below.

| Test | A (in g) | B (in g) | x and y (in g) |
|------|----------|----------|----------------|
| 1 | 10 | 5 | 2.1 |
| 2 | 15 | 5 | 2.65 |
| 3 | 15 | 10 | 4 |
| 4 | 7.5 | 2 | 1.5 |

The different hydrolyzates obtained from these tests are then applied in order to form, according to the method of the invention, composite materials including functionalized inorganic particles.

The operating procedure is the following:

In a micro-extruder provided by DSM equipped with two conical screws and with a flat die, are gradually incorporated 15 g of a poly(vinylidene fluoride-co-hexafluoropropene) copolymer as well as the hydrolyzates prepared beforehand, the characteristics of which in terms of ingredients appear in the table above.

The mixing is carried out at 190° C. for 15 minutes with a screw velocity of 100 revolutions/min. The material is then extracted at the exit by means of a micro-calendering machine also provided by DSM. Finally, a hybrid material film with a thickness comprised between 20 and 100 µm is recovered.

The table below groups the different proportions (in % by mass based on the total mass of the mixture) of mercaptopropyltriethoxysilane, of precondensate of tetramethoxysilane and of copolymer applied for the different tests.

| | PVDF-HFP | | Mercapto-SH compound | | Precondensate | |
|------|----------|--------|----------|--------|----------|--------|
| Test | Mass (in g) | % by mass | Mass (in g) | % by mass | Mass (in g) | % by mass |
| 1 | 15 | 50 | 10 | 33.3 | 5 | 16.7 |
| 2 | 15 | 42.8 | 15 | 42.9 | 5 | 14.3 |
| 3 | 15 | 37.5 | 15 | 37.5 | 10 | 25 |
| 4 | 15 | 61.2 | 7.5 | 30.6 | 2 | 8.2 |

The table below groups the characteristics of the material in terms of mass percentages of —SH functions, of functional inorganic particles as mentioned above and of non-functional silica particles.

| | —SH function | | Non-functional inorganic particles | | Functional inorganic particles | |
|------|--------|--------|--------|--------|--------|--------|
| Test | Mass (in g) | % by mass | Mass (in g) | % by mass | Mass (in g) | % by mass |
| 1 | 5.3 | 23 | 5 | 25 | 8.2 | 35.2 |
| 2 | 8 | 31 | 6.1 | 28.9 | 10.8 | 41.9 |
| 3 | 8 | 27.9 | 8.9 | 37.3 | 13.6 | 47.6 |
| 4 | 4 | 19.9 | 2.8 | 15.6 | 5.1 | 25.5 |

The aforementioned masses and mass % are determined in the same way as in Example 1 above.

The flow properties of films obtained from the aforementioned materials were evaluated with a RSA II rheometer provided by Rheometrics. The elastic moduli E' were determined by measurement in a flexural mode on rectangular test specimens of 1*3 cm. The table below groups the dimensional characteristics of the tested films as well as their flow characteristics. These films are identified, in the table below, by the % of —SH function mentioned in the table above.

| Film | Thickness (in µm) | Modulus E' |
|------|-------------------|------------|
| 0 | 50 | $5.3 * 10^8$ |
| 31.0 | 150 | $4.4 * 10^8$ |
| 27.9 | 450 | $5.2 * 10^8$ |
| 19.9 | 160 | $5.0 * 10^8$ |

The results indicated in the table above show that the introduction of an organic phase into the PVDF-HFP matrix does not induce any deep modifications of the mechanical properties of the matrix.

In order to test the possibility of applying the materials obtained according to the method of the invention as a fuel cell membrane, it was proceeded with the chemical transformation of the —SH functions into —SO$_3$H.

To do this, the aforementioned films are treated with a first oxidizing treatment with a bath comprising oxygenated water $H_2O_2$ at 30% for 24 hours at room temperature. Next, the film undergoes acidification with a 1N sulfuric acid $H_2SO_4$ solution for 24 hours at room temperature. Finally, the film is rinsed in several baths of distilled water until it returns to a neutral pH. The film is kept either in distilled water or in a dry condition by drying in vacuo at 60° C. for one night.

The proton conductivity measurements are determined by complex impedance spectroscopy by using an acquisition bench formed with a frequency analyzer (Solartron SI 1260) coupled with a measurement cell provided with 2 platinum electrodes (the surface are of the electrode of which is 0.5 cm$^2$). The measurements are conducted in immersed water and at room temperature.

If the membranes are considered as pure resistances, the complex impedance Z(ω) of the membrane corresponds to the combination of a real part (Z') and an imaginary part (Z") according to the following formula:

$$Z(\omega)=(U/I)=Z'+Z''=\text{Re}(Z)+\text{Im}(Z)$$

The change of Z" versus Z' is illustrated by the Nyquist diagram illustrated in FIG. 1 associated with a conventional representation of the equivalent circuit of an electrolyte.

When the change in the Nyquist diagram Z" (in Ω) is compared versus Z'(in Ω) of the sole PVDF-HFP matrix (curve a) with that of the membranes obtained in accordance with the method of the invention (curve b for film 23, curve c for film 31, curve d for film 27.9 and curve e for film 19.9, respectively), a significant reduction in the size of the semicircles is seen in the case of the membranes obtained with the method of the invention as compared with the sole PVDF-HFP matrix and characteristic of the increased proton conduction capabilities within the material. These results demonstrate that conducting inorganic fillers have been introduced into the polymeric matrix.

The invention claimed is:

1. A method for preparing a composite material comprising a polymeric matrix and a filler consisting of ion exchange inorganic particles comprising a step for synthesis in situ of said particles within the polymeric matrix,
    wherein the step for synthesis in situ is carried out with the sol-gel method comprising the following operations:
    an operation for putting the constitutive polymer(s) of the matrix in contact with one or more precursors of the inorganic particles, said precursor(s) fitting the following formula:

$$(X)_{y-n}\text{-M-}(R)_n$$

wherein:
    M is a metal element or a metalloid element;
    X is a hydrolyzable chemical group;

R is a chemical exchange group or a precursor group of an ion exchange chemical group;
y corresponds to the valence of the element M; and
n is an integer ranging from 0 to (y-1);
   an operation for hydrolysis-condensation of said precursor(s), by which operation inorganic particles are obtained resulting from the hydrolysis-condensation of said precursors;
   in the case when R is a precursor group of an ion exchange chemical group, an operation for transforming the precursor group into an ion exchange chemical group or, in the case when n =0, an operation for functionalizing said particles with ion exchange chemical groups,
   wherein R is a cation exchange group of formula —$R^2$—$Z^1$, wherein:
      $R^2$ is a simple bond, a linear or branched alkylene group or a cyclic hydrocarbon group;
      $Z^1$ is an —$SO_3H$, —$PO_3H_2$, or —$CO_2H$ group, optionally as salts; or
   wherein R is a group of formula —$R^2$—$Z^3$, wherein:
      $R^2$ is a simple bond, a linear or branched alkylene group, or a cyclic hydrocarbon group;
      $Z^3$ is a precursor group of a group $Z^1$ as defined above.

2. A method for preparing a composite material comprising a polymeric matrix and a filler consisting of ion exchange inorganic particles comprising a step for synthesis in situ of said particles within the polymeric matrix,
   wherein the step for synthesis in situ is carried out with the sol-gel method comprising the following operations:
      an operation for hydrolysis of one or more precursors of inorganic particles of the following formula:

$$(X)_{y-n}\text{-M-}(R)_n$$

wherein:
   M is a metal element or a metalloid element;
   X is a hydrolyzable chemical group;
   R is an ion exchange chemical group or a precursor group of an ion exchange chemical group;
   y corresponds to the valence of the element M; and
   n is an integer ranging from 0 to (y-1);
      an operation for putting the hydrolyzate obtained in the preceding step in contact with the constitutive polymer(s) of the matrix;
      an operation for heating the resulting mixture to an effective temperature in order to generate a transformation of the hydrolyzate into inorganic particles;
      in the case when R is a precursor group of an ion exchange chemical group, an operation for transforming the precursor group into an ion exchange chemical group or, in the case when n =0, an operation for functionalizing said particles with ion exchange chemical groups.

3. The method according to claim 1, wherein M is silicon, titanium or aluminium.

4. The method according to claim 1, wherein X is an —OR' group or a halogen atom, R' representing an alkyl group.

5. The method according to claim 1, wherein the precursor is a precursor of the following formula:

$$(OR')_{4-n}\text{—Si—}(R)_n$$

wherein:
   R' represents an alkyl group;
   R corresponds to the formula —$R^2$—$Z^3$, $R^2$ being a linear or branched alkylene group comprising from 1 to 30 carbon atoms and $Z^3$ being a precursor group of a group $Z^1$ wherein $Z^1$ is an —$SO_3H$, —$PO_3H_2$, or —$CO_2H$ group, optionally as salts;
   n is an integer ranging from 1 to 3.

6. The method according to claim 5, wherein the precursor is the mercaptopropyl-triethoxysilane of formula:

$$HS\text{—}(CH_2)_3\text{—}Si(OCH_2CH_3)_3.$$

7. The method according to claim 1, wherein the precursor is used in combination with a precondensate comprising recurrent units of the following formula:

$$M(X)_{y-2}$$

wherein:
   M is a metal or metalloid element;
   X is a hydrolysable chemical group;
   y corresponds to the valence of the element M.

8. The method according to claim 1, wherein the constitutive polymer(s) of the matrix are selected from fluorinated thermoplastic polymers.

9. The method according to claim 8, wherein the fluorinated thermoplastic polymers are non-ion exchange polymers selected from polytetrafluorethylenes (known under the acronym of PTFE), polyvinylidene fluorides (known under the acronym of PVDF), fluorinated ethylene/propylene copolymers (known under the acronym of FEP), copolymers of ethylene and tetrafluoroethylene (known under the acronym of ETFE), copolymers of vinylidene fluoride and hexafluoropropene (known under the acronym of PVDF-HFP) and mixtures thereof.

10. The method according to claim 8, wherein the fluorinated thermoplastic polymers are ion exchange polymers selected from perfluorinated sulfonated polymers.

11. The method according to claim 2, wherein M is silicon, titanium or aluminium.

12. The method according to claim 2, wherein X is an —OR' group or a halogen atom, R' representing an alkyl group.

13. The method according to claim 2, wherein R is a cation exchange group of formula —$R^2$—$Z^1$, wherein:
   $R^2$ is a simple bond, a linear or branched alkylene group or a cyclic hydrocarbon group;
   $Z^1$ is an —$SO_3H$, —$PO_3H_2$, or —$CO_2H$ group, optionally as salts.

14. The method according to claim 2, wherein R is a group of formula —$R^2$—$Z^3$, wherein:
   $R^2$ is a simple bond, a linear or branched alkylene group, or a cyclic hydrocarbon group;
   $Z^3$ is a precursor group of a group $Z^1$ wherein $Z^1$ is an —$SO_3H$, —$PO_3H_2$, or —$CO_2H$ group, optionally as salts.

15. The method according to claim 14, wherein the precursor is a precursor of the following formula:

$$(OR')_{4-n}\text{—Si—}(R)_n$$

wherein:
   R' is an alkyl group;
   R corresponds to the formula —$R^2$—$Z^3$, $R^2$ being a linear or branched alkylene group comprising from 1 to 30 carbon atoms and $Z^3$ being a precursor group of a group $Z^1$ wherein $Z^1$ is an —$SO_3H$, —$PO_3H_2$, or —$CO_2H$ group, optionally as salts;
   —n is an integer ranging from 1 to 3.

16. The method according to claim 15, wherein the precursor is the mercaptopropyl-triethoxysilane of formula:

$$HS\text{—}(CH_2)_3\text{—}Si(OCH_2CH_3)_3.$$

17. The method according to claim 2, wherein the precursor is used in combination with a precondensate comprising recurrent units of the following formula:

$$M(X)_{y-2}$$

wherein:
- M is a metal or metalloid element;
- X is a hydrolyzable chemical group;
- corresponds to the valence of the element M.

* * * * *

UNITED STATES PATENT AND TRADEMARK OFFICE
CERTIFICATE OF CORRECTION

| | | |
|---|---|---|
| PATENT NO. | : 9,065,109 B2 | Page 1 of 1 |
| APPLICATION NO. | : 13/704524 | |
| DATED | : June 23, 2015 | |
| INVENTOR(S) | : Pierrick Buvat et al. | |

It is certified that error appears in the above-identified patent and that said Letters Patent is hereby corrected as shown below:

Title Page, Item 75, 5th inventor's address: "Lyons (FR)" should be -- Lyon (FR) --.

In the Claims

Claim 7, Column 16, line 16: "hydrolysable" should be -- hydrolyzable --.

Claim 17, Column 17, line 10: "—corresponds to the valence of the element M." should be -- "—y corresponds to the valence of the element M. --.

Signed and Sealed this
Eighteenth Day of August, 2015

Michelle K. Lee
*Director of the United States Patent and Trademark Office*